(12) United States Patent
Whalen et al.

(10) Patent No.: US 11,554,695 B2
(45) Date of Patent: Jan. 17, 2023

(54) VEHICLE SEAT STORAGE SYSTEM

(71) Applicant: Honda Motor Co., Ltd., Tokyo (JP)

(72) Inventors: Kelly M. Whalen, Worthington, OH (US); Eric D. Daume, Plain City, OH (US); Paul D. Nguyen, Plain City, OH (US); Michael J. Wilms, Marysville, OH (US); Ganesh Narayanan, Plain City, OH (US)

(73) Assignee: HONDA MOTOR CO., LTD.

( * ) Notice: Subject to any disclaimer, the term of this patent is extended or adjusted under 35 U.S.C. 154(b) by 252 days.

(21) Appl. No.: 17/011,552

(22) Filed: Sep. 3, 2020

(65) Prior Publication Data

US 2022/0063459 A1 Mar. 3, 2022

(51) Int. Cl.
*B60N 2/30* (2006.01)
(52) U.S. Cl.
CPC .................. *B60N 2/3097* (2013.01)
(58) Field of Classification Search
CPC ..... B60N 2/3097; B60N 2/01583; B60N 2/20
See application file for complete search history.

(56) References Cited

U.S. PATENT DOCUMENTS

| | | | |
|---|---|---|---|
| 1,369,633 | A | 2/1921 | Dietrich et al. |
| 4,527,828 | A | 7/1985 | Groce et al. |
| 5,707,103 | A * | 1/1998 | Balk ............ B60N 2/3052 297/378.12 |
| 5,984,397 | A | 11/1999 | Dawson et al. |
| 6,270,140 | B1 | 8/2001 | Opfer et al. |
| 6,460,922 | B1 | 10/2002 | Demick |
| 6,843,526 | B2 * | 1/2005 | Honda ............ B60N 2/3011 297/14 |
| 6,869,138 | B2 | 3/2005 | Rhodes et al. |
| 6,883,854 | B2 | 4/2005 | Daniel |
| 6,959,960 | B2 | 11/2005 | Buccinna et al. |
| 7,040,685 | B2 | 5/2006 | Sumida et al. |
| 7,108,306 | B2 | 9/2006 | Suda et al. |

(Continued)

FOREIGN PATENT DOCUMENTS

| | | |
|---|---|---|
| EP | 1040960 | 10/2000 |
| JP | 2011251644 | 12/2011 |

(Continued)

OTHER PUBLICATIONS

Notice of Allowance of U.S. Appl. No. 16/379,187 dated Nov. 20, 2020, 10 pages.

*Primary Examiner* — Milton Nelson, Jr.
(74) *Attorney, Agent, or Firm* — Rankin, Hill & Clark LLP (57) ABSTRACT

A vehicle seat storage system includes a center passenger seat disposed between side passenger seats. The center seat includes a seat base and a seat back. A reclining mechanism mounted to one of side frame members of the seat base allows the seat back to move relative to the seat base. Seat anchors are disposed outwardly of the side frame members for securing a child seat. The center seat has a seating condition where the center seat is attached to a vehicle floor, and a stowed condition where the center seat is unattached from the floor with the seat back folded against the seat base. A vehicle interior sidewall includes a recessed portion configured to receive the center seat in the stowed condition. A lock mechanism provided in the recessed portion releasably engages the center seat when positioned in the recessed portion.

20 Claims, 8 Drawing Sheets

(56) References Cited

U.S. PATENT DOCUMENTS

| | | |
|---|---|---|
| 7,393,038 B2 | 7/2008 | Yajima et al. |
| 7,452,019 B1 | 11/2008 | Day |
| 7,686,367 B2 | 3/2010 | Neale |
| 7,753,428 B2 | 7/2010 | Kato et al. |
| 7,954,873 B2 | 6/2011 | Abe et al. |
| 8,011,714 B2 * | 9/2011 | Parkinson ............ B60N 2/3077 296/65.09 |
| 8,287,037 B2 | 10/2012 | Sayama |
| 8,291,734 B2 | 10/2012 | Kan et al. |
| 8,313,146 B2 | 11/2012 | Wagner et al. |
| 8,388,054 B2 | 3/2013 | Sayama |
| 8,590,970 B2 | 11/2013 | Takakura et al. |
| 8,708,392 B2 | 4/2014 | Otsuka et al. |
| 8,757,719 B2 | 6/2014 | Hayakawa |
| 8,770,659 B2 | 7/2014 | Isherwood et al. |
| 8,894,031 B2 | 11/2014 | Sailer et al. |
| 8,973,965 B2 | 3/2015 | Zalan et al. |
| 9,669,740 B2 | 6/2017 | Hansen et al. |
| 9,908,445 B2 | 3/2018 | Park et al. |
| 10,065,540 B1 | 9/2018 | Dry et al. |
| 2003/0184129 A1 | 10/2003 | Honda et al. |
| 2006/0255613 A1 | 11/2006 | Holmes et al. |
| 2008/0169668 A1 | 7/2008 | Muramatsu |
| 2009/0127904 A1 | 5/2009 | Yamada et al. |
| 2010/0102585 A1 | 4/2010 | Kato et al. |
| 2010/0117393 A1 | 5/2010 | Yamashita et al. |
| 2018/0057169 A1 | 3/2018 | Phi |
| 2018/0194252 A1 | 7/2018 | Sack et al. |
| 2019/0255974 A1 * | 8/2019 | Inoue ................... B60N 2/2893 |

FOREIGN PATENT DOCUMENTS

| | | |
|---|---|---|
| JP | 2013039849 | 2/2013 |
| JP | 2013180678 | 9/2013 |
| JP | 2013244940 | 12/2013 |
| JP | 5678839 | 3/2015 |
| JP | 2019064307 | 4/2019 |

* cited by examiner

VEHICLE SEAT STORAGE SYSTEM

BACKGROUND

Several vehicle types come equipped with multiple rows of vehicle seats, including a first row of seats for the vehicle driver and a front seat passenger, a second row of seats disposed immediately behind the first row, and a third row of seats disposed behind the second row of seats. Often, one or two vehicle doors are provided adjacent the second row of seats, but not adjacent the third row of seats. This necessitates occupants using the third row of seats to enter a door adjacent the second row of seats and maneuver back to the third row of vehicle seats and later maneuver forward past the second row of seats and exit a door adjacent the second row of seats. To facilitate such ingress and egress to and from the third row of seats, the second row of seats, or one or more seats thereof, can be equipped to tilt and/or slide forward to provide more access room. Additionally, the second row of seats can be provided with a gap between right-side and left-side seats allowing passengers to access the third row by passing in the gap between the seats of the second row of seats.

An auxiliary vehicle seat can be provided as part of the second row of seats and disposed in the gap between the lateral side seats of the second row of seats. This axillary seat is typically smaller than the adjacent lateral side seats and is sometimes removable. Production vehicles having removable independent second row center seats are generally not equipped with isofix seat anchors for attaching a child seat to the center seat. This is primarily because the center seat is typically not wide enough to adequately carry a child seat. Further, the removable center seat is typically folded into a stowed condition and either removed from the vehicle, placed on a cargo floor, or at least partially stowed in a sub-floor cargo space. However, a system for stowing a removable center seat configured for attachment of a child seat that would allow for the center seat to be stored within the interior cargo space, and yet not occupy any floor or sub-floor cargo space, would be desirable.

BRIEF DESCRIPTION

According to one aspect, a vehicle seat storage system comprises a center passenger seat disposed between a pair of side passenger seats in a vehicle seating arrangement. The center seat includes a seat base having side frame members supporting a seat base cushion, and a seat back having a seat back frame supporting a seat back cushion. The seat back is movably connected to the seat base. A reclining mechanism is mounted to one of the side frame members for allowing the seat back to be moved relative to the seat base. Seat anchors are disposed outwardly of the side frame members for securing an associated child seat. The center seat has a seating condition where the center seat is releasably attached to a floor of the vehicle and the seat back is upward from the seat base, and a stowed condition where the center seat is unattached from the floor and the seat back is folded against the seat base. An interior sidewall of the vehicle includes a recessed portion configured to at least partially receive the center seat in the stowed condition. A lock mechanism is provided in the recessed portion for releasably engaging the center seat when positioned in the recessed portion.

According to one aspect, a vehicle seat storage system comprises a passenger seat including a seat base having side frame members supporting a seat base cushion, and a seat back having a seat back frame supporting a seat back cushion. The seat back is movably connected to the seat base. A reclining mechanism is mounted to one of the side frame members for allowing the seat back to be moved relative to the seat base. Seat anchors are disposed outwardly of the side frame members for securing an associated child seat. Risers are pivotally attached to the seat base. Each of the risers includes a latch mechanism for releasably attaching the seat in a seating condition to a floor of the vehicle. In the seating condition the seat back is upward from the seat base. The seat has a stowed condition where the seat is unattached from the floor and the seat back is folded against the seat base. An interior sidewall of the vehicle includes a recessed portion configured to at least partially receive the seat in the stowed condition. The seat further includes a striker for releasable engagement with a lock mechanism provided in the recessed portion.

According to one aspect, a method for storing a passenger seat in a vehicle comprises providing a passenger seat. The passenger seat includes a seat base having side frame members supporting a seat base cushion, a seat back having a seat back frame supporting a seat back cushion, the seat back movably connected to the seat base, a reclining mechanism mounted to one of the side frame members for allowing the seat back to be moved relative to the seat base, and seat anchors disposed outwardly of the side frame members for securing an associated child seat. The method includes configuring the passenger seat to have a seating condition where the seat is releasably attached to a floor of the vehicle and a stowed condition where the seat is unattached from the floor; providing an interior sidewall of the vehicle with a recessed portion sized and configured to at least partially receive the seat in the stowed condition; providing a lock mechanism within the recessed portion; providing a striker on the seat base for engagement with the lock mechanism; moving the seat into the stowed condition and detaching the seat in the stowed condition from the floor; positioning the seat in the stowed condition into the recessed portion; and securing the seat in the stowed condition via engagement of the striker with the lock mechanism.

DETAILED DESCRIPTION

It should, of course, be understood that the description and drawings herein are merely illustrative and that various modifications and changes can be made in the structures disclosed without departing from the present disclosure.

Figure 1:
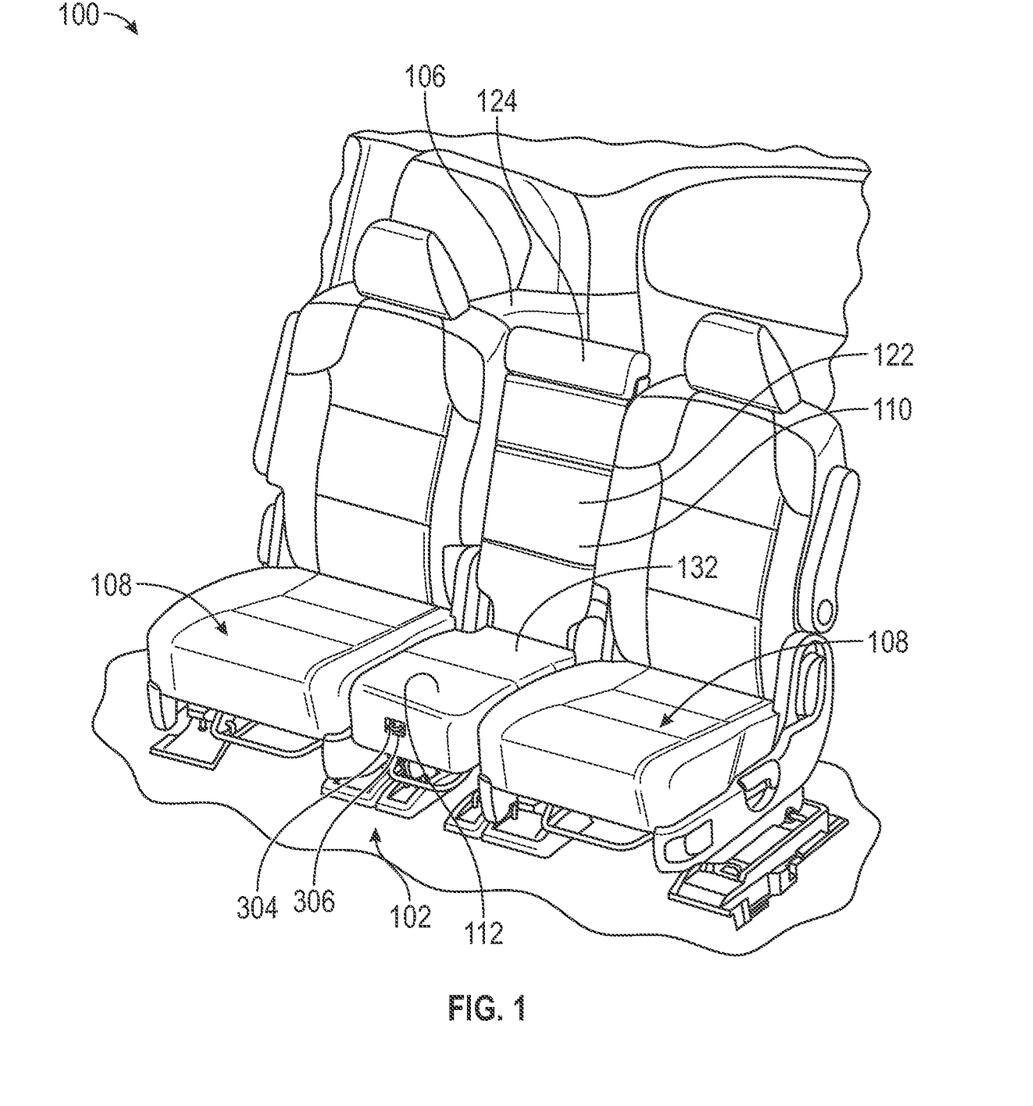
FIG. 1 is a partial view of an interior of a vehicle depicting a seating arrangement for the exemplary vehicle seat storage system.
Figure 2:
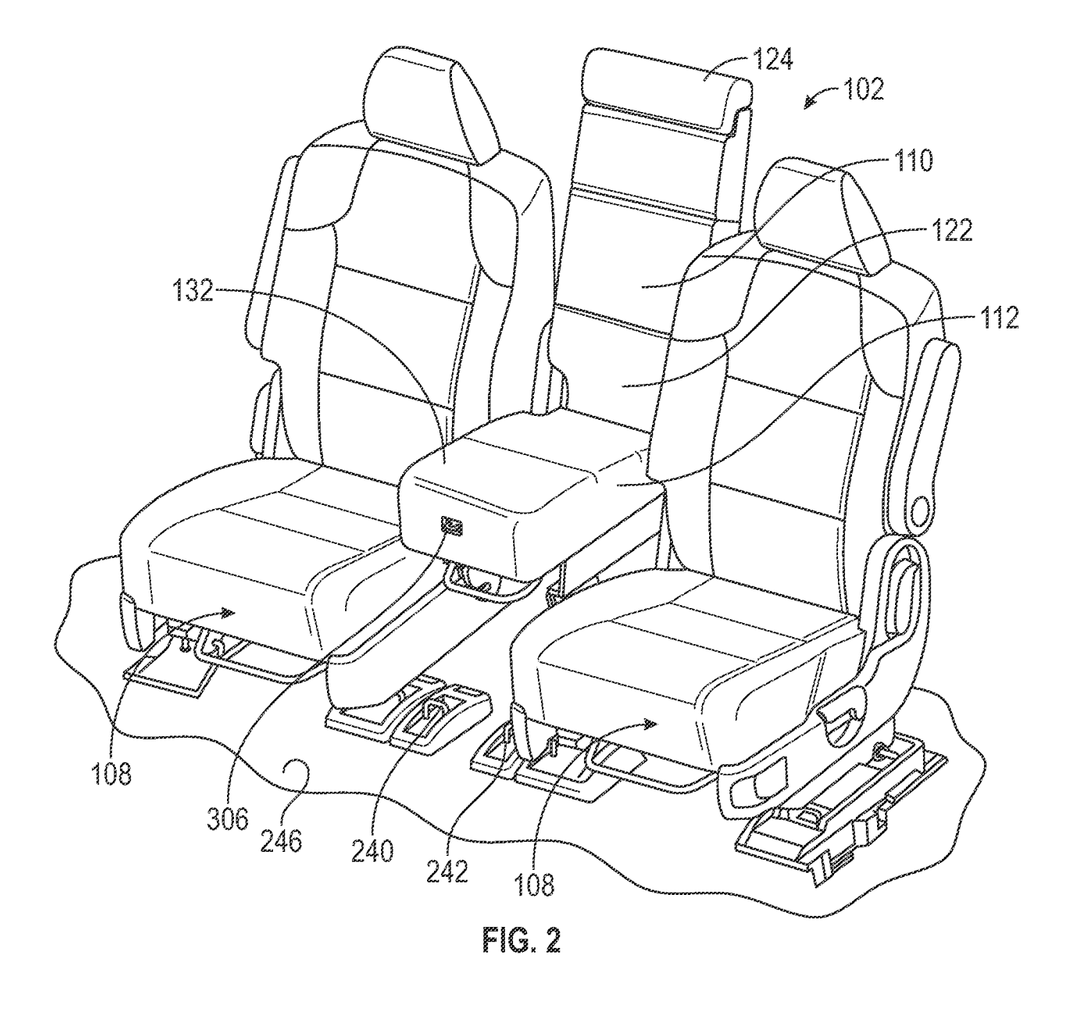
FIG. 2 depicts the seating arrangement of FIG. 1 with one of the passenger seats (i.e., a center seat) being removed.
Figure 4:
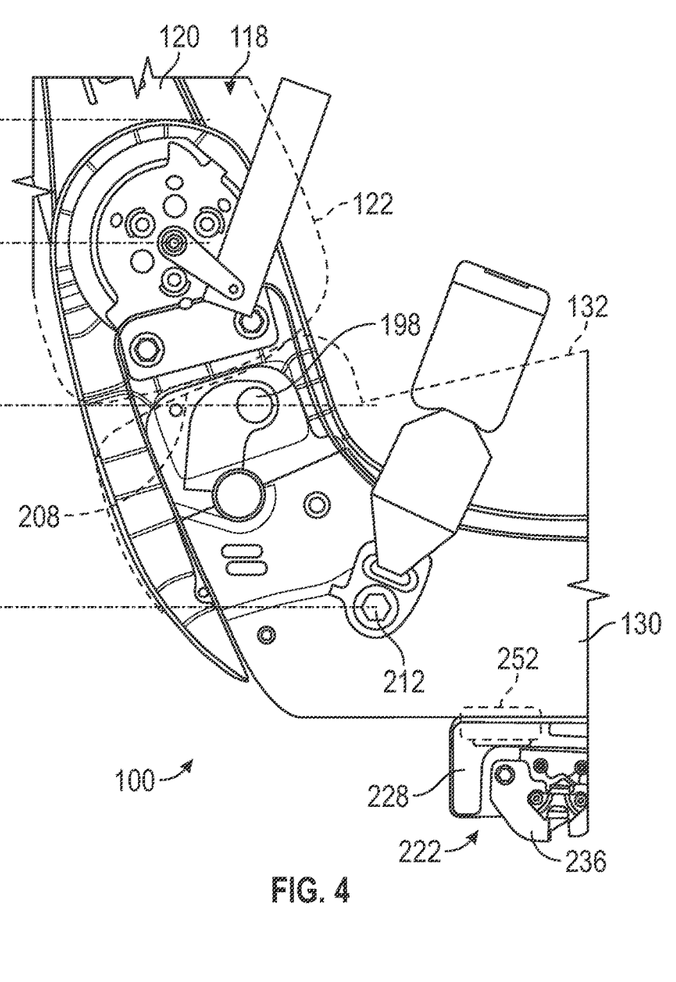
FIG. 4 is a side view of structural components of the center seat of FIG. 2, a spacing of the structural components compared to those of FIG. 3.

Referring now to the drawings, wherein like numerals refer to like parts throughout the several views, FIGS. 1 and 2 illustrate a vehicle seat storage system 100 for a vehicle (e.g., minivan, van, crossover, sport utility etc.) according to the present disclosure. In general, the seat storage system 100 includes a passenger seat 102 and a recessed portion 104 (FIG. 9) defined in an interior sidewall 106 of the vehicle which is sized and configured to at least partially receive the passenger seat in a stowed condition of the passenger seat 102. The passenger seat 102 can be part of a seating arrangement wherein the passenger seat 102 is a center seat located between outboard or lateral side seats 108, however this is not required. The passenger seat 102 includes a seat back 110 and a seat base 112 pivotally coupled to the seat back, as is known in the art, for example by a reclining mechanism 118 (FIG. 4). As described herein, the term seat back is used generically, and should be interpreted to include structural components of the seat back 110, including a frame 120 (FIG. 6B), a cushion 122 supported by the frame and/or an optional headrest 124. Similarly, the term seat base is used generically, and should be interpreted to include structural components of the seat base 112, including side frame members 128, 130 (FIGS. 4 and 7) and/or a cushion 132 supported by the side frame members.

Figure 3:
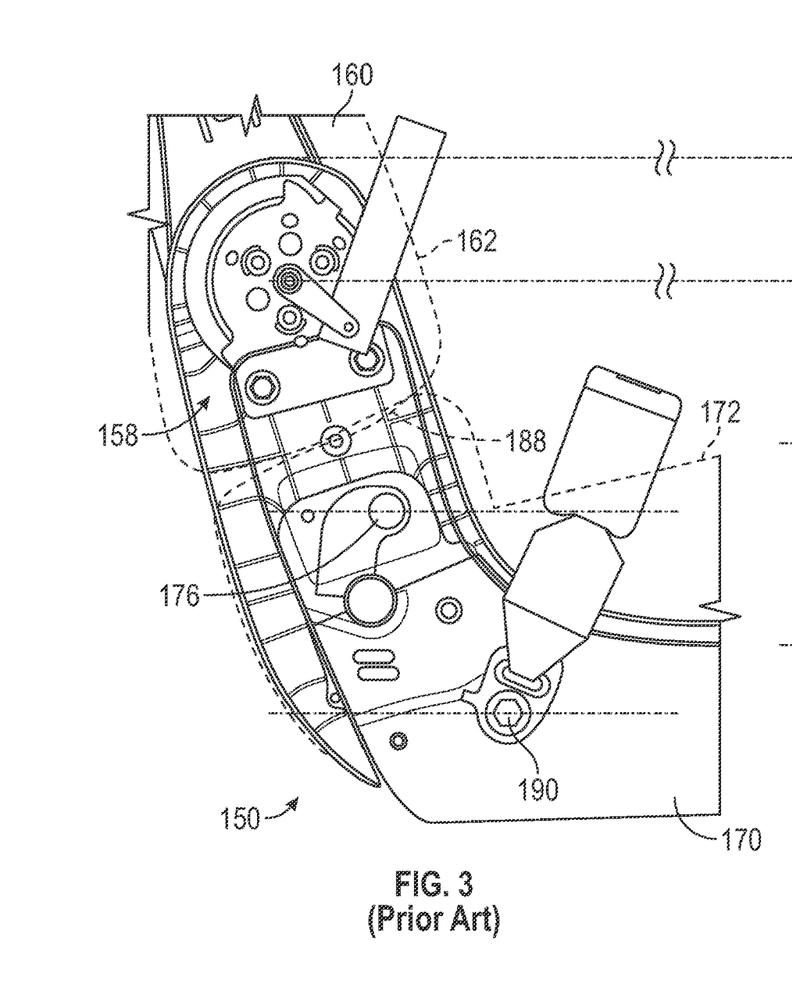
FIG. 3 is a partial side view of structural components of a prior art passenger seat.
Figure 5A:
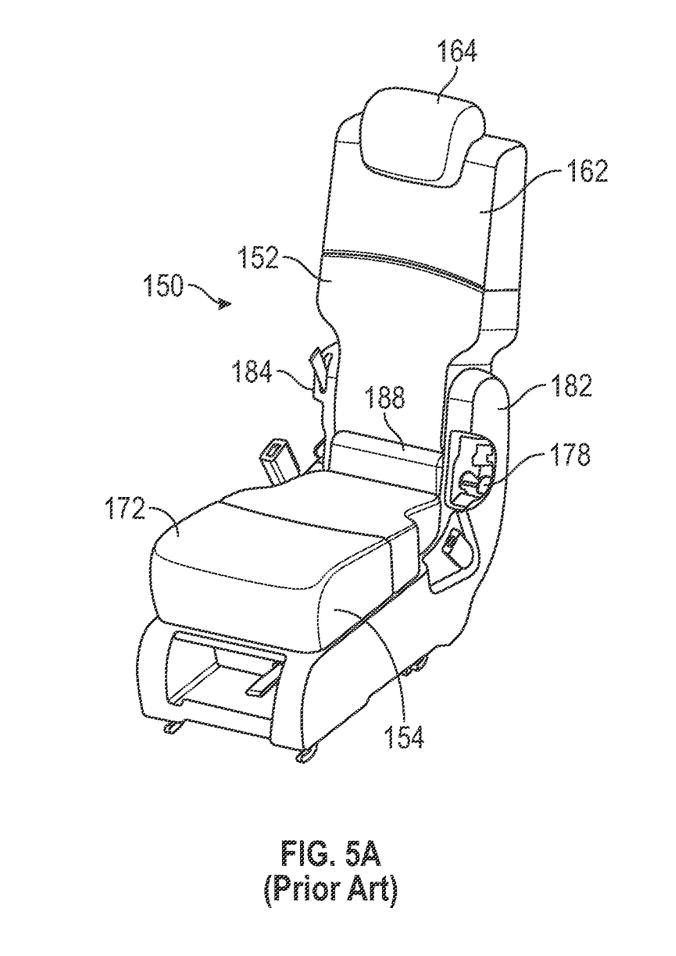
FIGS. 5A and 5B depict the prior art passenger seat.
Figure 5B:
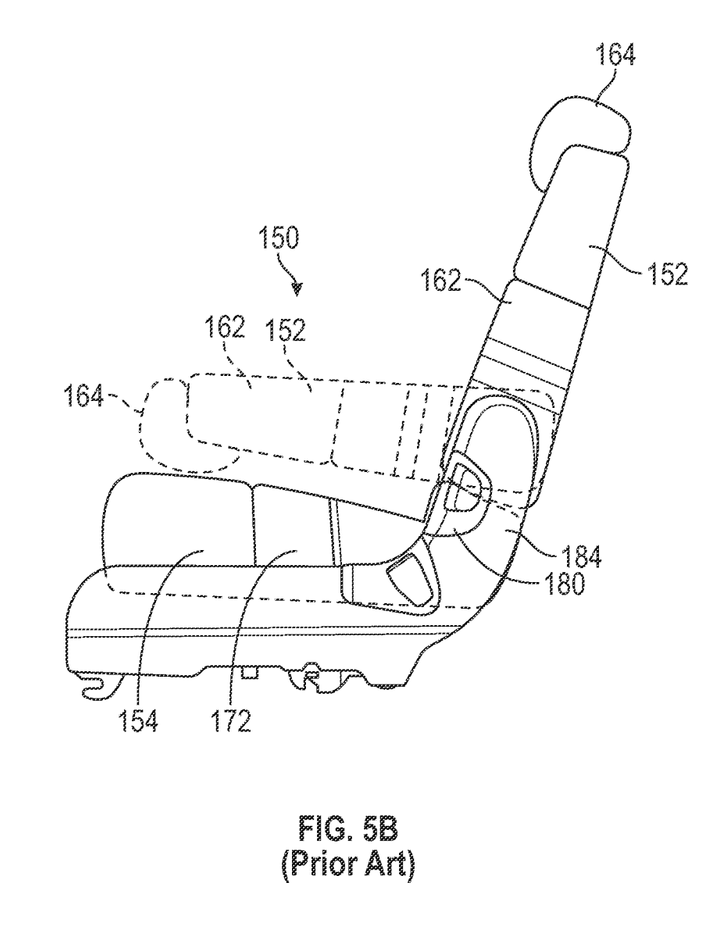

According to the present disclosure, the exemplary passenger seat 102 is equipped with isofix seat anchors for attaching an associated child seat to the passenger seat 102 and is configured to have a reduced overall depth dimension in the stowed condition as compared to a known center seat 150 allowing the passenger seat 102 to be easily stored in the recessed portion 104. By way of comparison, the known center seat 150 is depicted in FIGS. 3, 5A and 5B. The center seat 150 includes a seat back 152 and a seat base 154 pivotally coupled to the seat back by a reclining mechanism 158. The seat back 152 includes a frame 160, a cushion 162 supported by the frame, and a headrest 164. The seat base 154 includes side frame members (only side frame member 170 is shown) supporting a cushion 172. The center seat 150 include a pair of spaced part seat anchors 176, 178 disposed beneath removable covers (only cover 180 is shown) and adjacent lateral sides of the center seat 150. The anchor covers form portions of recliner covers 182, 184. The anchors 176, 178 are fixedly secured to at least the side frame members for securing an associated child seat to the center seat 150. The side frame members are interconnected by a main frame member (not shown) that extends laterally along a rear of the seat base 154 adjacent to seat back 152. The anchors 176, 178 flank lateral sides of the seat back 152 and the seat base 154. As shown, the anchors 176, 178 are located vertically beneath an upper surface 188 of a rear part of the seat base 154. A buckle anchor 190 is affixed to the side frame member 170. Because the seat bite of the center seat 150 is elevated due to the shape of the seat base rear part, the center seat 150 has a high recline axis (i.e., the axis defined by the reclining mechanism 158 about which the seat back 152 pivots relative to the seat base 154). This can allow the seat back 152 to be folded over onto the seat base 154; however, the cushion 162 of the folded seat back 152 is elevated from the cushion 172 of the seat base 154 and is supported thereon by the headrest 164, which extends at least partially onto the seat back cushion 162 to support an upper end part of the seat back 152. Therefore, an overall depth dimension of the center seat in this folded condition is increased by the gap between the cushions 162, 172.

Figure 6A:
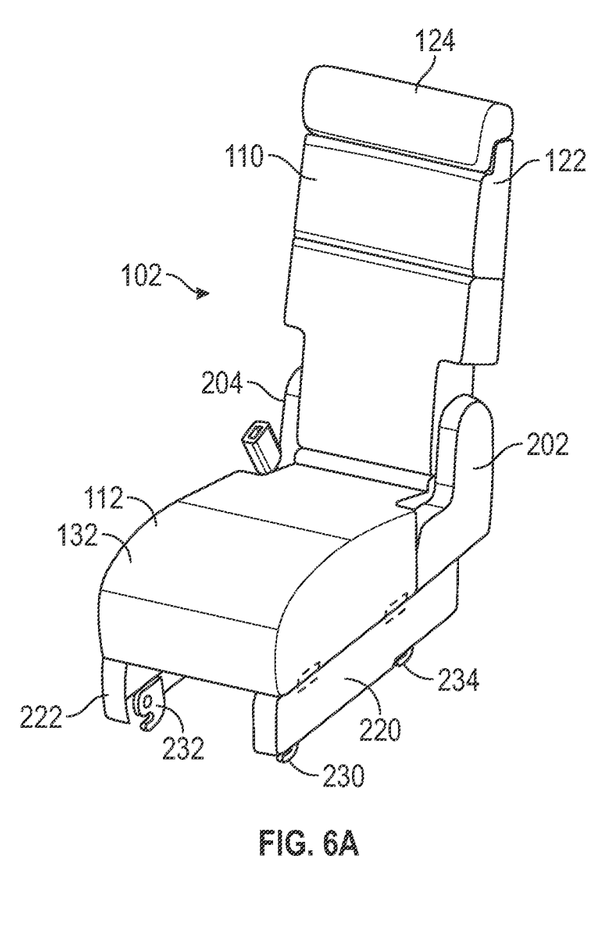
FIGS. 6A and 6B depict the center seat of FIG. 2.
Figure 6B:
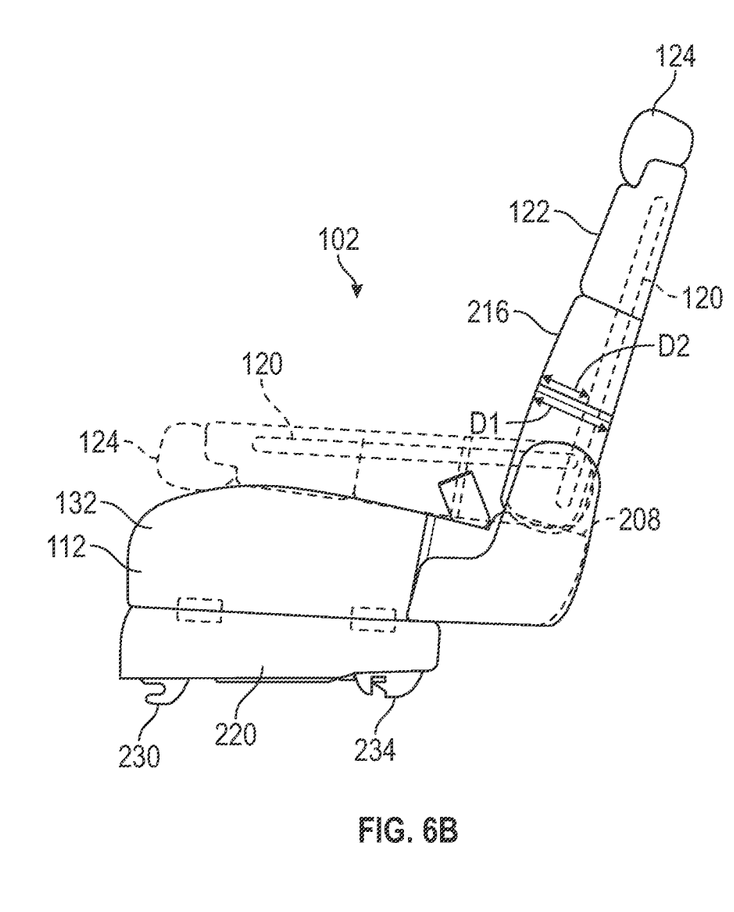
Figure 7:
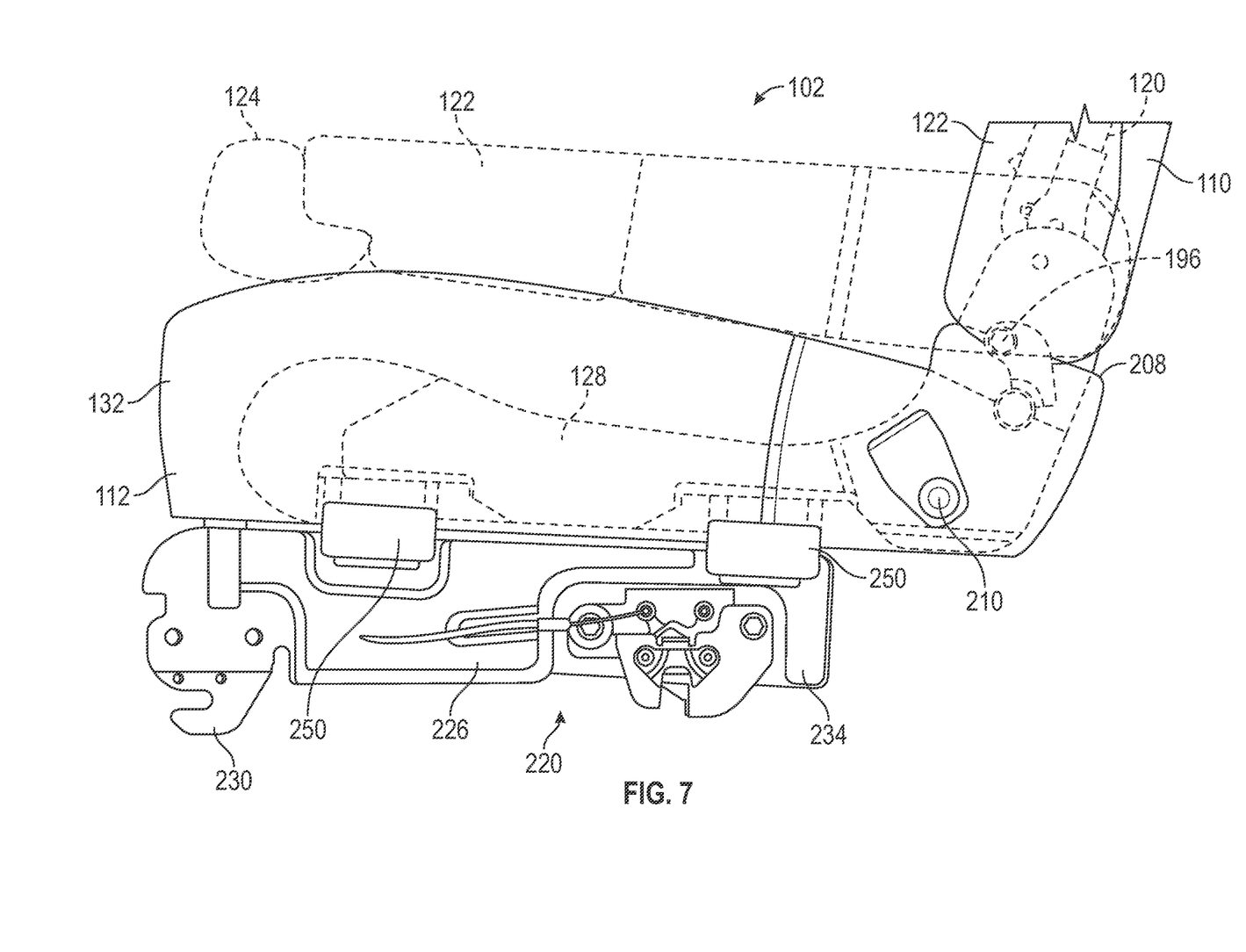
FIG. 7 is a side view of structural components of the center seat of FIG. 2.

With reference to FIGS. 4, 6A, 6B and 7, the exemplary passenger seat 102 also include a pair of spaced part seat anchors 196, 198 disposed beneath removable covers (not shown) and adjacent lateral sides of the passenger seat 102. Each anchor cover can form a portion of a recliner cover 202, 204. The anchors 196, 198 are fixedly secured to at least the side frame members 128, 130 for securing a child seat to the passenger seat 102. The side frame members 128, 130 are interconnected by a main frame member (not shown) that extends laterally along a rear of the seat base 112 adjacent to seat back 110. The anchors 196, 198 flank lateral sides of the seat back 110 and the seat base 112. As shown, the anchors 176, 178 can be located substantially in vertical alignment with an upper surface 208 of a rear part of the seat base 112. A buckle anchor 210, 212 is affixed to each side frame member 128, 130. Similar to the center seat 150, the passenger seat 102 has a recline axis defined by the reclining mechanism 118, which allows the seat back 110 to be folded over onto the seat base 112. However, unlike the center seat 150, the cushion 122 of the seat back 110 rests directly against the cushion 132 of the seat base 112 allowing the passenger seat 102 to have a reduced total depth dimension "D" in the stowed condition (which is between 250 mm and 260 mm—FIG. 8). It should be appreciated that this reduced total depth dimension of the passenger seat 102 in the stowed condition is at least partially due to the dimensional layout of the components of the passenger seat 102. Specifically, FIGS. 3 and 4 compare the layout of the passenger seat 102 with the layout of the center seat 150. As shown, reclining mechanisms 118, 158 are secured to the side frame members 130, 170 so that the recline axes defined by the reclining mechanisms 118, 158 are vertically aligned. However, a distance between a common center axis of the seat anchors 196, 198 and the recline axis (i.e., rotational axis) of the reclining mechanism 118 for the passenger seat 102 (which is between 80 mm and 85 mm) is less than a distance between a common center axis of the seat anchors 176, 176 and the recline axis (i.e., rotational axis) of the reclining mechanism 158 of the center seat 150 (which is about 115 mm). This reduced dimension, in turn, shifts upwardly the buckle anchor 212 (as compared to buckle anchor 190) and allows for a reduced thickness of the seat base cushion 132. Further, to provide for a reduced total depth dimension of the passenger seat 102 in the stowed condition, a total depth dimension "D1" of the seat back cushion 122 is between 80 mm and 90 mm, and a maximum distance "D2" between a forward facing supporting surface 216 of the seat back cushion 122 and the seat back frame 120 is between 45 mm and 50 mm (FIG. 6B). In addition, it should be appreciated that by designing the headrest 124 to not extend onto the forward facing supporting surface 216 of the seat back cushion 122, the seat back 110 is not impeded from resting directly against the seat base 112 and can be arranged substantially parallel to each other.

Figure 8:
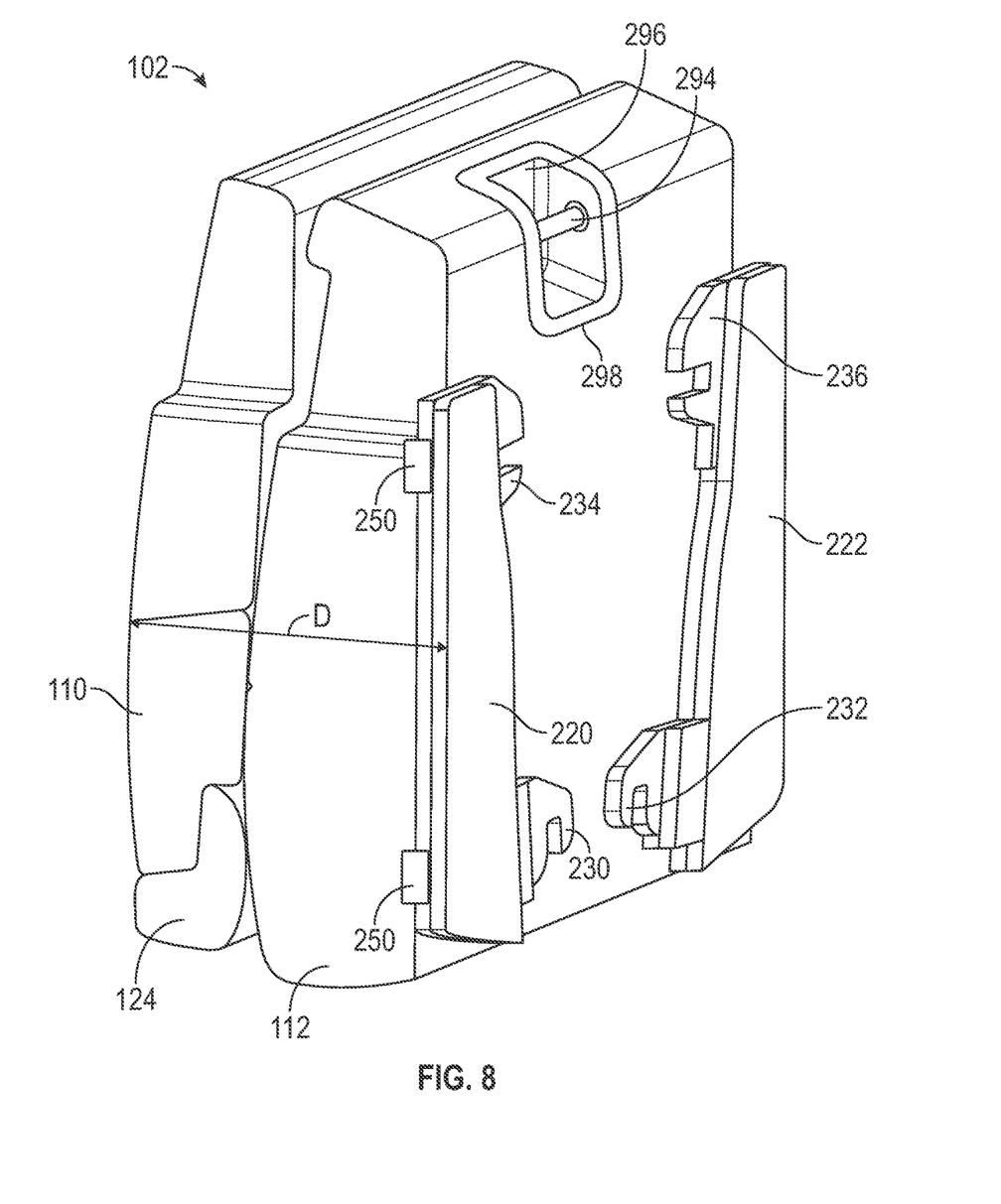
FIG. 8 depicts the center seat in the stowed condition with risers folded against an underside of the seat base.
Figure 9A:
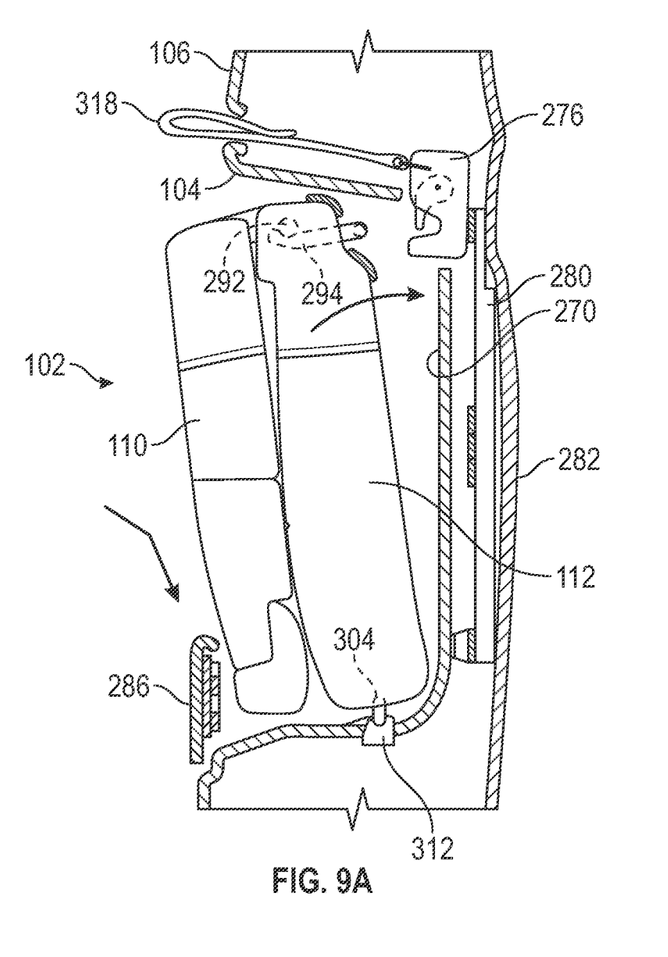
FIGS. 9A and 9B depict the center seat being positioned in a recessed portion of the vehicle for storage.
Figure 9B:
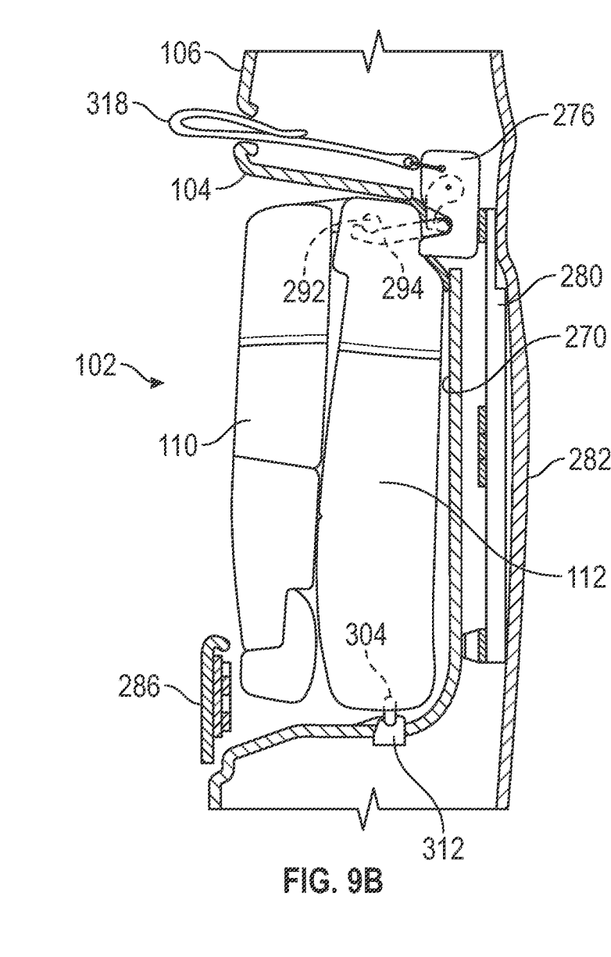

According to the present disclosure, the passenger seat 102 further includes risers 220, 222 which are pivotally attached to the side frame members 128, 130 of the seat base 112. Each of the risers 220, 222 have a deployed position (FIGS. 6A and 6B) and a folded position (FIG. 8). In the deployed position, the risers 220, 222 are oriented substantially perpendicular to the seat base 112 for supporting the seat base 112 in the seating condition. In the folded position, the risers 220, 222 are folded inwardly against an underside of the seat base 112, which places the passenger seat 102 into the stowed condition. Each of the risers 220, 222 includes a frame 226, 228 pivotally secured to the seat base 112 via folding mechanisms 250, 252 and latch mechanism mounted to the frame for releasably attaching the passenger seat 102 in the seating condition to the vehicle floor 246. In the depicted aspect, the latch mechanism for each riser 220, 222 can include one or more latches (i.e., forward latches 230, 232 and rear latches 234, 236) that are each engageable with an engaging member (i.e., strikers 240, 242 shown in FIG. 2 for the forward latches 230, 232) that is fixedly attached to vehicle floor 246. To remove the passenger seat 102, the seat back 110 can be first folded against the seat base 112. The rear latches 234, 236 can then be released or unlatched from the engaging members on the vehicle floor 246. The passenger seat 102 can then pivot forwardly about the forward latches 230, 232 allowing the passenger seat 102 to be removed from the vehicle floor. Once removed the risers 220, 222 can be folded against the seat base 112 (FIG. 8). It should be appreciated that the passenger seat 102 can be released or unlatched from the vehicle floor 246 and then removed without first folding the seat back 110 against the seat base 112. It should further be appreciated that to provide for the reduced total depth dimension of the passenger seat 102 in the stowed condition, in the folded position a depth of each riser 220, 222 and its folding mechanism 250, 252 is between 45 mm and 50 mm.

Therefore, the passenger seat 102 has minimum package size when in the stowed condition due to the spacing of the reclining mechanism 118 relative to the seat anchors 196, 198 and the location of the buckle anchors 210, 212 on the side frame members 128, 130, the location of the seat back frame 120, and the folding risers 220, 222. The unique placement and combination of these components allow a minimum package while also meeting all strength requirements and regulations. The passenger seat 102 integrates all structural features into one assembly aimed at meeting all seat regulation requirements, specifically for attachment of an associated child seat.

As indicated above, the interior sidewall 106 of the vehicle includes the recessed portion 104 sized and configured to at least partially receive the passenger seat 102 in the stowed condition. In the depicted aspect of FIGS. 9A and 9B, the interior sidewall 106 is an interior trim panel, for example a left rear quarter trim panel or a right rear quarter trim panel. The recessed portion 104 can have an inner wall 270 shaped complementary with the passenger seat 102 in the stowed condition. A lock mechanism 276 for securing the passenger seat 102 is provided in an upper part of the recessed portion 104. The lock mechanism 276 is mounted to a separate support structure 280 mounted in the recessed portion 104 between the inner wall 270 and an inner panel member 282 of the vehicle body. The support structure 280 is configured to provide strength to the recessed portion 104 to limit deformation of the recessed portion and possible release of the passenger seat 102 from within the recessed portion 104 during a crash event. A garnish member 286 is adapted to cover a lower part of the recessed portion 104. The garnish member 286 together with inner wall 270 of the recessed portion 104 defines a pocket 290 for at least partially receiving the passenger seat 102 in the stowed condition.

Further depicted in FIG. 8, the passenger seat 102 includes a striker 294 for engagement with the lock mechanism 276 The striker 294 is positioned within a cutout 296 located at a rear end or side of the seat base 112, and a garnish 298 can frame the cutout 296. It should be appreciated that the striker 294 can be secured a frame member 292 of the seat base 112, which can be the main frame member of the seat base 112 between the anchors 196, 198. This allows the striker 294 to optionally serve as a tether anchor for attachment of a center tether strap of an associated child seat. However, the frame member 292 can be separate from the main frame member such that the striker 294 is a component separate from a tether anchor and configured only for the lock mechanism 276, thereby preventing attachment of a center tether strap. According to the depicted aspect, the seat base 112 includes another striker 304 located at a forward end or side of the seat base 112. In FIGS. 1 and 2, the striker 304 is also positioned within a cutout 306 and a garnish can frame the cutout 306. A clasp 312 is provided in the lower part of the recessed portion 104 for releasable engagement with the striker 304. It should be appreciated that engagement of the striker 304 and clasp 312 serves as a locating feature for the passenger seat 102 being placed within the pocket 290. With the striker 304 received within the clasp 312, the passenger seat 102 is properly positioned within the pocket 290, and the passenger seat can then be rotated for engagement of the striker 294 with the lock mechanism 276. A release member 318 is provided on the interior sidewall 106 outside of the recessed portion 104. The release member 318 is operably connected to the lock mechanism 276, and actuation of the release member moves the lock mechanism from a locked state to an unlocked state for disengagement of the striker 294. In the depicted aspect, the release member is in the form of a pull strap; although alternative configurations (e.g., a lever, a push button, a switch) are contemplated.

While in use, the passenger seat 102 can be attached to the vehicle floor 246 and used by one or more individuals that are traveling within the vehicle. In the alternative, the passenger seat 102 can be used to place articles or items on, for example groceries. In the event that space that is occupied by the passenger seat 102 while it is attached to the floor 246 is desired to be used and/or unoccupied by the seat, the passenger seat 102 can be removed or detached from the floor and folded into the stowed condition. After being folded into the stowed condition, the passenger seat 102 can be placed at least partially within the recessed portion 104 on the interior sidewall 106. After the passenger seat 102 has stored, space previously occupied by the passenger seat is available for use, and floor and/or sub-floor cargo space is still available.

According to the present disclosure, a method for storing the passenger seat 102 in a vehicle. The method includes configuring the passenger seat 102 to have a seating condition where the seat is releasably attached to the vehicle floor 246 and a stowed condition where the seat is unattached from the vehicle floor; providing the interior sidewall 106 of the vehicle with the recessed portion 104 sized and configured to at least partially receive the passenger seat 102 in the stowed condition; providing the lock mechanism 276 within the recessed portion 104; providing the striker 294 on the seat base 112 for engagement with the lock mechanism 276; moving the passenger seat 102 into the stowed condition and detaching the passenger seat in the stowed condition from the vehicle floor 246; positioning the passenger seat 102 in the stowed condition into the recessed portion 104; and securing the passenger seat 102 in the stowed condition via engagement of the striker 294 with the lock mechanism 276.

The method further includes operably connecting the release member 318 to the lock mechanism 276 to move the lock mechanism from a locked state to an unlocked state; and folding the risers 220, 220 inwardly against the seat base 112 after the passenger seat 102 in the stowed condition is detached from the vehicle floor.

It should be appreciated that any term of degree used herein, such as "substantially", means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle seat storage system comprising:
a center passenger seat disposed between a pair of side passenger seats in a vehicle seating arrangement, the center seat including:
a seat base having side frame members supporting a seat base cushion,
a seat back having a seat back frame supporting a seat back cushion, the seat back movably connected to the seat base,
a reclining mechanism mounted to one of the side frame members for allowing the seat back to be moved relative to the seat base, and
seat anchors disposed outwardly of the side frame members for securing an associated child seat,
wherein the center seat has a seating condition where the center seat is releasably attached to a floor of the vehicle and the seat back is upward from the seat base, and a stowed condition where the center seat is unattached from the floor and the seat back is folded against the seat base; and
an interior sidewall of the vehicle, the interior sidewall including a recessed portion configured to at least partially receive the center seat in the stowed condition, and a lock mechanism is provided in the recessed portion for releasably engaging the center seat when positioned in the recessed portion.

2. The system of claim 1, wherein the center seat further includes a first striker for engagement with the lock mechanism.

3. The system of claim 2, wherein the first striker is located at a rear end of the seat base.

4. The system of claim 3, wherein the seat base includes a second striker located at a forward end of the seat base, and a clasp is provided in the recessed portion for releasable engagement with the second striker.

5. The system of claim 1, including a release member is provided on the interior sidewall outside of the recessed portion, the release member operably connected to the lock mechanism, wherein actuation of the release member moves the lock mechanism from a locked state to an unlocked state.

6. The system of claim 5, wherein the release member is a pull strap.

7. The system of claim 1, including a separate support structure mounted in the recessed portion, the lock mechanism mounted to the support structure.

8. The system of claim 1, including a garnish member adapted to cover a lower section of the recessed portion, the garnish member together with inner surfaces of the recessed portion defining a pocket for at least partially receiving the center seat in the stowed condition.

9. The system of claim 1, wherein the seat base and the seat back are configured for a total depth dimension of the center seat in the stowed condition of between 250 mm and 260 mm.

10. The system of claim 9, wherein to provide for the total depth dimension of the center seat in the stowed condition a distance between a common center axis of the seat anchors and a rotational axis of the reclining mechanism is between 80 mm and 85 mm.

11. The system of claim 9, wherein to provide for the total depth dimension of the center seat in the stowed condition, a total depth dimension of the seat back cushion is between 80 mm and 90 mm, and a distance between a forward facing supporting surface of the seat back cushion and the seat back frame is between 45 mm and 50 mm.

12. The system of claim 9, wherein the center seat further includes risers pivotally attached to the seat base, each of the risers includes a latch mechanism for releasably attaching the center seat in the seating condition to the vehicle floor, the risers having a deployed position for supporting the seat base in the seating condition and a folded position where the risers are folded inwardly against the seat base in the stowed condition.

13. A vehicle seat storage system comprising:
a passenger seat including:
a seat base having side frame members supporting a seat base cushion,
a seat back having a seat back frame supporting a seat back cushion, the seat back movably connected to the seat base,
a reclining mechanism mounted to one of the side frame members for allowing the seat back to be moved relative to the seat base,
seat anchors disposed outwardly of the side frame members for securing an associated child seat, and
risers pivotally attached to the seat base, each of the risers includes a latch mechanism for releasably attaching the seat in a seating condition to a floor of the vehicle,
where in the seating condition the seat back is upward from the seat base,
and the seat has a stowed condition where the seat is unattached from the floor and the seat back is folded against the seat base; and
an interior sidewall of the vehicle, the interior sidewall including a recessed portion configured to at least partially receive the seat in the stowed condition,
wherein the seat further includes a striker located on the seat base for releasable engagement with a lock mechanism provided in the recessed portion.

14. The system of claim 13, including a release member provided on the interior sidewall outside of the recessed portion, the release member operably connected to the lock mechanism, wherein actuation of the release member moves the lock mechanism from a locked state to an unlocked state.

15. The system of claim 13, including a separate support structure mounted in the recessed portion, the lock mechanism mounted to the support structure.

16. The system of claim 13, including a garnish member adapted to cover a lower section of the recessed portion, the garnish member together with inner surfaces of the recessed portion defining a pocket for at least partially receiving the in the stowed condition.

17. The system of 16, wherein the seat includes a second striker for releasable engagement with a clasp provided in the pocket of the recessed portion.

18. A method for storing a passenger seat in a vehicle comprising:
providing a passenger seat including:
a seat base having side frame members supporting a seat base cushion, a seat back having a seat back frame supporting a seat back cushion, the seat back movably connected to the seat base, a reclining mechanism mounted to one of the side frame members for allowing the seat back to be moved relative to the seat base, and seat anchors disposed outwardly of the side frame members for securing an associated child seat;

configuring the passenger seat to have a seating condition where the seat is releasably attached to a floor of the vehicle and a stowed condition where the seat is unattached from the floor;

providing an interior sidewall of the vehicle with a recessed portion sized and configured to at least partially receive the seat in the stowed condition;

providing a lock mechanism within the recessed portion;

providing a striker on the seat base for engagement with the lock mechanism;

moving the seat into the stowed condition and detaching the seat in the stowed condition from the floor;

positioning the seat in the stowed condition into the recessed portion; and securing the seat in the stowed condition via engagement of the striker with the lock mechanism.

19. The method of claim 18, including providing a release member on the interior sidewall outside of the recessed portion, and operably connecting the release member to the lock mechanism to move the lock mechanism from a locked state to an unlocked state.

20. The method of claim 18, wherein the seat further includes risers pivotally attached to the seat base, each riser includes a latch mechanism for releasably attaching the seat in the seating condition to the vehicle floor, and the method includes folding the risers inwardly against the seat base after the seat in the stowed condition is detached from the floor.

* * * * *